United States Patent [19]
Dorrestijn et al.

[11] Patent Number: 5,948,858
[45] Date of Patent: *Sep. 7, 1999

[54] RUBBER-MODIFIED POLYMER COMPOSITION

[75] Inventors: Antoon Dorrestijn, Born; Cornelis E. Koning, Schinnen; Wilhelmus G. M. Bruls, Meerssen, all of Netherlands

[73] Assignee: DSM NV, Heerleen, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,357

[22] Filed: Dec. 27, 1996

[30]     Foreign Application Priority Data

Dec. 29, 1995 [BE] Belgium ................... 9501089

[51] Int. Cl.$^6$ ............ C08L 51/04; C08L 55/02; C08L 77/00
[52] U.S. Cl. .................................. 525/66; 524/112
[58] Field of Search ............... 525/66; 524/112, 524/296

[56]     References Cited

U.S. PATENT DOCUMENTS

| | | | |
|---|---|---|---|
| 4,421,892 | 12/1983 | Kasahara et al. | |
| 4,452,931 | 6/1984 | Okamoto | 524/100 |
| 4,713,415 | 12/1987 | Lavengood | 525/66 |
| 5,280,060 | 1/1994 | Abe | 524/234 |
| 5,317,054 | 5/1994 | Chiang | 524/451 |

FOREIGN PATENT DOCUMENTS

| | | |
|---|---|---|
| 0 068 132 A2 | 1/1983 | European Pat. Off. . |
| 0 202 214 A2 | 11/1986 | European Pat. Off. . |
| 0 402 528 A2 | 12/1990 | European Pat. Off. . |
| WO 94-12575 | 6/1994 | WIPO . |

OTHER PUBLICATIONS

Database WPI, Section Ch, Week 8833, Derwent Publications Ltd., London, GB, Class A18, AN 88–231705.

*Primary Examiner*—Patricia A. Short
*Attorney, Agent, or Firm*—Pillsbury Madison & Sutro, LLP

[57]     ABSTRACT

The invention relates to a polymer composition comprising 5 to 79 wt. % of a graft copolymer of vinyl aromatic monomers and monomers chosen from the group of $C_1$–$C_4$ alkyl methacrylates, $C_1$–$C_4$ alkyl acrylates, methacrylonitrile and acrylonitrile on a rubber, 90 to 20 wt. % of a thermoplastic polyamide polymer and 1 to 50 wt. % of a polymer comprising a vinyl aromatic monomer, at least one monomer chosen from the group of $C_1$–$C_4$ alkyl methacrylates, $C_1$–$C_4$ alkyl acrylates, methacrylonitrile and acrylonitrile, and 0.2 to 30 mol % of a compound containing $\alpha$, $\beta$-unsaturated dicarboxylic anhydride, the wt. % of the components being relative to the total weight of the components, characterized in that the composition also comprises at least one monofunctional dicarboxylic-anhydride-containing compound (D) with a weight average molecular weight of less than 1500 g/mol. The polymer composition exhibits excellent mechanical properties, in particular a high impact resistance.

8 Claims, No Drawings

RUBBER-MODIFIED POLYMER COMPOSITION

FIELD OF THE INVENTION

The instant invention relates to a polymer composition comprising (A) a graft copolymer of vinyl aromatic and vinyl cyanide monomer units on a rubber, (B) a thermoplastic polyamide and (C) a polymer comprising a vinyl aromatic monomer, acrylonitrile and a compound containing α, β-unsaturated dicarboxylic anhydride.

DESCRIPTION OF THE RELATED ART

Such a polymer composition is known from EP-A-402.528. EP-A-402.528 describes a polymer composition comprising a polyamide, an acrylonitrile-butadiene-styrene graft copolymer (ABS) and a terpolymer obtained by polymerization of styrene, acrylonitrile and maleic anhydride (MA). ABS-type polyamide polymers and graft copolymers are not miscible and consequently form two separate phases when mixed. The poor miscibility results in a polymer composition having relatively poor properties. The terpolymer described above acts as a compatibility-enhancing agent between the polyamide and the ABS polymer and its application in the composition results in higher impact resistance.

Although the impact resistance of the known polymer composition is reasonably good, there is nevertheless a need to further increase its impact resistance. Moreover, the impact resistance of the known composition is highly temperature dependent. Thus the impact resistance at low temperatures, for instance at −20° C. (the 'cold impact resistance'), is low. In many applications, for instance in the automotive industry, this is a serious drawback. A high cold impact resistance is required for instance for polymer compositions used in bumpers.

SUMMARY OF THE INVENTION

The object of the invention is to provide a polymer composition which possesses a high impact resistance, also at low temperatures, and which moreover has excellent processing characteristics.

To that effect the polymer composition according to the invention is characterized in that the composition also comprises at least one monofunctional dicarboxylic-anhydride-containing compound (D) with a weight average molecular weight of less than 1500 g/mol.

Surprisingly, this results in an impact resistance at room temperature which is substantially higher than for a similar polymer composition in which compound (D) is absent.

A further advantage of the polymer composition according to the invention is that it has good processing characteristics. Thus, the viscosity of the polymer composition, as measured for instance by means of the Melt Flow Index (MFI) is relatively insensitive to the amount of compound (D) added to the composition, over a wide range of compound (D) additions.

DETAILED DESCRIPTION OF THE INVENTION

The polymer composition according to the invention is preferably characterized in that the weight average molecular weight of component (D) is lower than 500 g/mol. This further enhances the advantages of the composition according to the invention.

Suitable compounds (D) for the polymer composition according to the invention are all dicarboxylic-anhydride-containing compounds which are monofunctional towards the polyamide polymer (B). Monofunctional, defined in the context of the present patent application means that compound (D) can and will mainly react with the polyamide polymer chains via the anhydride functionality. Compound (D) may nevertheless comprise other groups that are reactive with the primary amine of the polyamide, but the reactivity of those groups with the polyamide has to be much lower than the reactivity of the polyamide with the dicarboxylic anhydride group in compound (D). In any case double-functionality bonds between polyamide polymer chains in compound (D) should be avoided, because otherwise the viscosity of the polymer composition becomes so high that it affects its processability. That is the reason why dianhydrides for instance are excluded as compound (D) in the polymer composition. Suitable compounds (D) are for instance $C_4$–$C_{10}$ aliphatic dicarboxylic anhydrides, such as for instance succinic anhydride, glutaric anhydride, adipic anhydride, and so on. Cycloaliphatic dicarboxylic anhydrides, such as for instance 1,2-cyclohexane dicarboxylic anhydride, are highly suitable. Application of 1,2-cyclohexane dicarboxylic anhydride has the additional advantage that it counteracts discoloration of the polymer composition according to the invention by the effect of environmental factors, such as for instance sunlight. Furthermore, dicarboxylic-anhydride-containing compounds (D) comprising ethylenic unsaturations are generally suitable. An example of such an ethylenically saturated compound is maleic anhydride. Compounds (D) comprising an aromatic unsaturation are also suitable for application in the composition according to the invention. Examples of suitable aromatic compounds (D) are phthalic anhydride and/or trimellitic anhydride. Although for instance trimellitic anhydride contains acid groups substituted at the aromatic ring, which groups can in principle react with the polyamide, the reactivity of the reaction is low enough relative to the polyamide polymer to prevent bonding or crosslinking between polyamide polymer chains. Preferentially, phthalic anhydride is used. Besides an additionally improved impact resistance, a phthalic-anhydride-containing polymer composition according to the invention offers the advantage of being highly suitable for use in products which may come into contact with food.

The amount of compound (D) to be used can be chosen within wide limits. The suitable amount will usually be determined as the quantity of compound (D) which for a given composition of graft copolymer (A), polyamide (B) and polymer (C) results in the optimum desired mechanical property, such as for instance the cold impact resistance. Usually a small amount of compound (D) already yields the desired effect. The amount of compound (D) preferably is between 0.1 and 10 mmol per 100 g of component (B). More preferably the amount of compound (D) is between 2.5 and 5 mmol per 100 g of component (B). Due to the application of such an amount of compound (D) the cold impact resistance in particular of the polymer composition is further improved.

The graft copolymer (A) in the polymer composition according to the invention comprises a graft copolymer of a vinyl aromatic compound, a vinyl cyanide and optionally a third monomer on a rubber. Suitable vinyl aromatic compounds are chosen for instance from the group comprising styrene, α-methyl-styrene, o-vinyl toluene, m-vinyl toluene and/or p-vinyl toluene, vinyl naphthalene, dimethyl styrene, t-butyl styrene and halogenated styrene derivatives, such as for instance chlorostyrene or bromostyrene. The vinyl aromatic compound to be applied preferably is styrene and/or α-methyl styrene. Suitable vinyl cyanide compounds are for instance chosen from the group comprising acrylonitrile and cyanoalkylene compounds containing 4–7 carbon atoms, such as methacrylonitrile. Preferably the vinyl cyanide compound applied is acrylonitrile and/or methacrylonitrile. Suitable third monomers are chosen for instance from the group comprising acrylates and methacrylates, such as for instance methyl methacrylate and ethyl acrylate, and substituted or non-substituted imide derivatives of α, β-unsaturated dicarboxylic acids and α, β-unsaturated dicarboxylic anhydrides, such as for instance maleimide and N-phenyl maleimide.

The rubber for the graft copolymer can be chosen from the known rubbers. The only restriction which applies to the rubber is that it should not be functionalized. If functionalized rubbers are used the impact resistance of the polymer composition according to the invention is not achieved. A 'functionalized rubber' defined in the context of the present patent application means a rubber onto which reactive groups, such as ethylenically unsaturated electrophile groups and/or monomers containing carboxylic acid groups have been grafted along with the polyamide.

In general the glass transition temperature of these rubbers is lower than −10° C. Suitable rubbers are for instance chosen from the group comprising butadiene rubbers and ethene-propene copolymers, optionally comprising a third copolymerizable diene monomer, such as 1,4-hexadiene, dicyclopentadiene, di-cyclooctadiene, methylene norbornene, ethylidene norbornene and tetrahydroindene. Optionally, the graft copolymer also contains a minor amount of natural rubber and/or an elastomer which mainly consists of 1,3 diene compounds such as butadiene-1,3, isoprene and 2,3-dimethyl butadiene-1,3. Preference is given to polybutadiene homopolymers or to butadiene copolymers having a butadiene content of 60–90 wt. %. Particularly suitable graft copolymers in the polymer composition according to the invention are acrylonitrile-styrene-butadiene (ABS), acrylonitrile-styrene-acrylate (ASA) and an ethene-propene-diene rubber polymerized with styrene and acrylonitrile (AES). Most preferably an acrylonitrile-styrene-butadiene (ABS) graft copolymer is used in the composition according to the invention. The amount of rubber in the graft copolymer is preferably 20–70 wt. %, more preferably 35–65 wt. %. Most preferably the percentage of rubber is 40–50 wt. %. The average particle size of the polybutadiene rubber can be chosen between wide limits. The average particle size of the polybutadiene rubber preferably is between 0.1 and 0.5 μm. It is possible to use rubber particles having a bimodal particle size distribution, i.e. a particle size distribution in which the particle sizes are grouped around two different average particle sizes.

The graft copolymer can be synthetized by generally known processes. Examples of such processes are methods of mass polymerization, emulsion polymerization, suspension polymerization and mass suspension polymerization. By preference, emulsion polymerization is applied. Furthermore, the polymerization preferably is carried out in such a way that a grafting efficiency (the monomer fraction that is grafted onto the rubber) of at least 20 wt. % is achieved. More preferably, the grafting efficiency is at least 40 wt. % and is accomplished using methodology commonly employed in the art.

The customary auxiliary agents can be used in the polymerization process. Examples of such auxiliary agents are chain controllers, emulsifiers and compounds yielding free radicals. The weight average molecular weight of the graft copolymer can be chosen between wide limits, for instance between 80,000 g/mol and more than 200,000 g/mol. There are advantages in carrying out the polymerization in such a way that the weight average molecular weight of the graft copolymer is lower than 200,000 g/mol, more preferably lower than 170,000 g/mol, most preferably lower than 130,000 g/mol. This results in further improvement of the flow of the polymer composition according to the invention without any significant decline of its high impact resistance. Optionally, a separately obtained copolymer of vinyl aromatic and vinyl cyanide monomer units, preferably styrene and acrylonitrile, can be added to the graft copolymer.

Suitable polyamides (B) for the composition according to the invention are the conventional polyamide resins which are known under the name 'nylon', including the aliphatic polylactams. Polyamides are obtained by polycondensation of aliphatic, alicyclic and aromatic diamines and dicarboxylic acids. Suitable polyamides are for instance nylon 6 (polycaprolactam), nylon 11, nylon 12 (polylauryllactam), nylon 4.6 (polytetramethyleen adipamide), nylon 6.6 (polyhexamethylene adipamide), nylon 6.10 (polyhexamethylene sebacamide), nylon 6.9 (polyhexamethylene azelamide). It is also possible to use nylon copolymers, for instance random copolymers of nylon 6 and 6.6, of nylon 6 and 4.6, of nylon 6.6 and 6.10 and of nylon 6 and 11. Copolyamides into which for instance cyclohexyl dicarboxylic acid, naphthalene dicarboxylic acid and/or terephthalic acid have been integrated as comonomer are also suitable as component (B) in the polymer composition according to the invention. By preference the polyamide is a nylon 6, nylon 6,6 and/or a random copolymer of nylon 6,6 and nylon 6. The weight average molecular weight of the polyamide preferably is higher than 20,000 g/mol. Other suitable polyamides are branched, optionally star-branched, polyamides, as described for instance by J. M. Warakomski, Chem. Mater. 4, 1000–04, (1992).

In the framework of the present patent application, polymers are deemed to be miscible if they form a composition consisting of a single phase. If polymers are only partially miscible or not at all, they will form separate phases in a composition. The specific morphology that results depends on the relative quantities and the nature of the polymers combined in the composition. If an excess of one polymer is applied, then that particular polymer will in general form a continuous phase in which the other polymer is dispersed. If about equal quantities of the polymers are applied, a morphology with a co-continuous structure can result. Polymers are deemed to be compatible if they form a stable multi-phase composition having practically useful mechanical properties, in particular a high impact strength and/or elongation at break. Incompatible polymers by contrast form a multi-phase composition with inferior properties compared with the polymers individually.

Polyamides in general are neither miscible, nor compatible with hydrocarbon resins such as polystyrene or acrylonitrile-butadiene-styrene graft copolymers.

A compatible composition of polyamide and graft copolymers of the ABS type with useful properties is obtained through application of polymer (C), which acts as a compatibilizing agent. The polymer (C) in the composition according to the invention typically comprises (C1) a vinyl aromatic monomer, (C2) at least one monomer chosen from the group of C1 to C4 alkyl methacrylates, C1 to C4 alkyl acrylates, methacrylonitrile and acrylonitrile, and (C3) 0.2 to 30 mol % of an α, β-unsaturated compound containing dicarboxylic anhydride. Polymer (C) preferably is a terpolymer of (C1) styrene and/or α-methyl styrene, (C2) acrylonitrile and (C3) 0.2 to 30 mol % of maleic anhydride. A good impact resistance is achieved in particular if the amount of maleic anhydride in component (C) is chosen between 0.5 and 6.0 mol %.

The weight average molecular weight of polymer (C) can be chosen within wide limits. For instance, molar masses between approximately 60,000 g/mol and more than 250,000 g/mol are suitable.

There are advantages in choosing the weight average molecular weight of polymer (C) between 160,000 g/mol and 230,000 g/mol. Most preferably, the polymer is characterized in that the amount of maleic anhydride is between 0.5 and 6.0 mol % and the weight average molecular weight is between 180,000 g/mol and 210,000 g/mol. This results in further improvement of the mechanical properties, in particular at low temperatures.

Polymer (C) can be prepared in a usual manner. A suitable method is to dissolve in a suitable solvent, for instance methyl ethyl ketone (MEK), the component monomers of the polymer, for instance styrene, maleic anhydride and acrylonitrile. One or, optionally, more chemical initiators are added to this solution. Suitable initiators are for instance peroxides. Then the mixture is polymerized for a number of hours at an elevated temperature, after which the residual content of solvent and non-converted monomers is removed in a known way.

The ratio between the styrene monomer and the acrylonitrile monomer in polymer (C) is preferably between 80:20 and 50:50. In order to improve the miscibility of polymer (C) with the graft copolymer (A), the relative quantity of styrene monomer in polymer (C) is preferably chosen virtually equal to the relative quantity of styrene monomer in the graft copolymer (A).

The relative quantity of polymer (C) in the composition according to the invention is between 1 and 50 wt. %, preferably between 1 and 15 wt. %, more preferably between 1.5 and 10 wt. %. Most preferably, the relative quantity of polymer (C) in the composition according to the invention is between 2 and 6 wt. %.

The polymer composition according to the invention can be prepared thermoplastically in a known way and then be processed to a moulded part. Suitable preparation equipment is for instance a single-screw or twin-screw extruder. For the processing to a moulded part an injection moulding machine can be used. The composition can also be compression moulded to an end product. Due to the excellent processability of the polymer composition according to the invention it is highly suitable for the manufacture of a wide variety of objects. Because of the excellent flow behaviour of the polymer composition according to the invention it is in particularly suitable for injection moulding of large moulded parts, which in general involves long flow paths. Examples of large moulded parts are bumpers, mudguards, front fascias, dashboards, interior door panels and centre consoles of motorcars.

If desired, additives can be added to the polymer composition according to the invention. Examples of customary additives are stabilizers, antioxidants, lubricants, fillers, colorants, pigments, flame retarding agents, conductive fibres and reinforcing fibres such as glass fibres or carbon fibres. The additives can optionally be added before or during the processing step.

The invention will now be elucidated by means of the following non-restrictive examples.

EXAMPLES AND COMPARATIVE EXPERIMENTS

Components Used

A1—an ABS polymer obtained by grafting styrene and acrylonitrile onto polybutadiene rubber by means of emulsion polymerization. The styrene:acrylonitrile weight ratio is 70:30. The rubber content is 40 wt. %. This ABS is available from DSM in the Netherlands under the tradename Ronfalin™ TZ220.

B1—a polyamide 6 available from DSM in the Netherlands under the tradename Akulon™ K123. The eight average molecular weight was 22,000 g/mol.

C1—a terpolymer of styrene, acrylonitrile and MA. This terpolymer is obtained by dissolving in methyl ethyl ketone (MEK) styrene and acrylonitrile in a ratio of 2.2:1 and an amount of MA. The resulting mixture is polymerized at an elevated temperature, after which the solvent is evaporated. The weight average molecular weight of the terpolymer was determined by means of the GPC method described below. The mole percentage of MA in the terpolymer was calculated from the polymerization conversion and the amount of MA added to the solution, and amounted to 2.5 mol %.

C2—a terpolymer of styrene, acrylonitrile and MA, obtained in the same was as C1. The mole percentage of MA in the terpolymer was 4.0 mol %.

D—phthalic anhydride, available from the firm of Acros in Belgium.

Polymer compositions were prepared from the above compositions, in the following way. The components (A, B, C and D) were supplied to a Schwabenthan™ single-screw extruder running at 60 rpm. The temperature setting along the length of the extruder was 50/150/190/230/245/245/245° C. The melting temperature was about 270° C. Only the polyamide was pre-dried. The granulate obtained was pre-dried under vacuum at 80° C. for 16 hours. Then the granulate was injection moulded to test bars on a standard Arburg™ injection moulding machine, the temperature of the melt being about 260° C. The mould temperature was 70° C. The composition of the polymers prepared is indicated in the table below (numbers of parts by weight of components A, B and C combined to 100 wt. %). To each of the compositions 1.1 wt % of customary additives as well as a variable amount of compound (D) as indicated in the table were added.

TABLE 1

| Example | compositions | | | | |
|---|---|---|---|---|---|
| | A1 | B1 | C1 | C2 | D |
| 1 | 54.8 | 39.2 | 6.0 | — | 0.290 |
| 2 | 54.8 | 39.2 | 6.0 | — | 0.218 |
| 3 | 54.8 | 39.2 | 6.0 | — | 0.145 |
| 4 | 54.8 | 39.2 | — | 6.0 | 0.290 |
| 5 | 54.8 | 39.2 | — | 6.0 | 0.218 |
| 6 | 54.8 | 39.2 | — | 6.0 | 0.145 |
| A | 54.8 | 39.2 | 6.0 | — | — |
| B | 54.8 | 39.2 | — | 6.0 | — |

Testing and Characterization Methods Used

The Izod notched impact resistance was measured according to ASTM D-256 at temperatures of −20° C., 0° C. and 23° C. The test bar thickness was 6.4 mm.

The flexural modulus and strength were measured according to ASTM D-790 at 23° C.

The instrumented falling dart impact test was carried out at 23° C. and −20° C. on square clamped test plates with a thickness of 3.2 mm. A dart with a hemispherical head and a diameter of 10 mm was used. The velocity of fall was 4.4 m/s. The fracturing behaviour (with or without splintering) and the total absorbed energy at −20° C. and 23° C. were determined.

The Melt Flow Index (MFI) measured according to ASTM D 1238 was determined as a measure of the flow.

The temperature resistance of the samples was measured by means of the Vicat 850 method according to ASTM D 1525.

The weight average molecular weight was determined by gel permeation chromatography (GPC) according to ASTM Method D 3536–91.

The test results obtained are shown in table 1.

The total dissipated energy in the falling dart impact test at 23° C. in Examples 1–6 was 43.8 J/43.9 J/43.8 J/44.1 J/43.8 J and 44.6 J, respectively. The flexural modulus at 23° C. amounted to 1823 MPa/1852 MPa/1905 MPa/1807 MPa/1847 MPa and 1914 MPa, respectively. The Vicat value was 101.1° C./103.5° C./105.9° C./105.3° C./104.6° C. and 104.7° C., respectively.

TABLE 2

| Example | test results | | | |
|---|---|---|---|---|
| | Izod 23° C. (kJ/m$^2$) | Izod 0° C. (kJ/m$^2$) | Izod −20° C. (kJ/m$^2$) | MFI (dg/10 min) |
| 1 | 20.2 | — | — | 8.4 |
| 2 | 74.5 | 18.5 | 15.3 | 5.7 |
| 3 | 78.2 | 63.9 | 21.8 | 3.9 |
| 4 | 46.0 | — | — | 8.0 |
| 5 | 75.7 | 60.7 | 20.4 | 6.0 |
| 6 | 78.3 | 65.3 | 23.7 | 3.2 |
| A | 31.0 | — | — | 2.0 |
| B | 11.0 | — | — | 0.6 |

What is claimed is:

1. A high impact resistant polymer composition formulated from constituents comprising:

(A) 5 to 79 wt. % of a graft copolymer of vinyl aromatic monomers and monomers selected from the group consisting of $C_1$–$C_4$ alkyl methacrylates, $C_1$–$C_4$ alkyl acrylates, methacrylonitrile and acrylonitrile on a rubber;

(B) 90 to 20 wt. % of a thermoplastic polyamide;

(C) 1 to 50 wt. % of a polymer comprising (C1) a vinyl aromatic monomer unit, (C2) at least one monomer unit based on a monomer selected from the group consisting of $C_1$–$C_4$ alkyl methacrylates, $C_1$–$C_4$ alkyl acrylates, methacrylonitrile and acrylonitrile, and (C3) 2.5 to 4 mol % of maleic anhydride, wherein the wt. % of components (A), (B) and (C) is relative to the total weight of components (A), (B) and (C); and between 2.5 and 5 mmol per 100 g of compound (B) of at least one monofunctional dicarboxylic anhydride-containing compound (D) with a weight average molecular weight of less than 1500 g/mol, which imparts a notched Izod value at 0° C. of at least 18.5 kJ/m$^2$.

2. A high impact resistant polymer composition formulated from constituents comprising:

(A) 5 to 79 wt. % of a graft copolymer of vinyl aromatic monomers and monomers selected from the group consisting of $C_1$–$C_4$ alkyl methacrylates, $C_1$–$C_4$ alkyl acrylates, methacrylonitrile and acrylonitrile on a rubber;

(B) 90 to 20 wt. % of a thermoplastic polyamide;

(C) 1 to 50 wt. % of a polymer comprising (C1) a vinyl aromatic monomer unit, (C2) at least one monomer unit based on a monomer selected from the group consistent of $C_1$–$C_4$ alkyl methacrylates, $C_1$–$C_4$ alkyl acrylates, methacrylonitrile and acrylonitrile, and (C3) 2.5 to 6 mol % of maleic anhydride, wherein the wt. % of components (A), (B) and (C) is relative to the total weight of components (A), (B) and (C); and between 2.5 and 5 mmol per 100 g of compound (B) of at least one monofunctional dicarboxylic anhydride-containing compound (D) with a weight average molecular weight of less than 1500 g/mol, which imparts a notched Izod value at 0° C. of at least 18.5 kJ/m$^2$.

3. The polymer composition according to claim 1 or 2, wherein the weight average molecular weight of compound (D) is less than 500 g/mol.

4. The polymer composition according to claim 3, wherein compound (D) is phthalic anhydride.

5. The polymer composition according to claim 2, wherein compound (D) is phthalic anhydride.

6. The polymer composition according to any one of claims 1, 2 or 5, wherein the weight average molecular weight of the graft copolymer is lower than 130,000 g/mol.

7. The polymer composition according to any one of claims 1, 2 or 5, wherein the amount of component (C) comprises between 2 and 6 wt. %, relative to the combined weight of components (A), (B) and (C).

8. The polymer composition according to any one of claims 1, 2, or 5, wherein the weight average molecular weight of polymer (C) is between 180,000 g/mol and 210,000 g/mol.

* * * * *